United States Patent
Semmens et al.

[19]

[11] Patent Number: 6,074,774
[45] Date of Patent: Jun. 13, 2000

[54] SEALED RECHARGE BATTERY PLENUM STABILIZED WITH STATE CHANGEABLE SUBSTANCE

[75] Inventors: Michael G. Semmens; Ajoy Datta; Fardad Forouzan, all of Austin, Tex.

[73] Assignee: Electrosource, Inc., San Marcos, Tex.

[21] Appl. No.: 09/089,977

[22] Filed: Jun. 3, 1998

[51] Int. Cl.[7] .......................... H01M 10/02; H01M 10/06
[52] U.S. Cl. ..................... 429/50; 429/62; 429/94; 429/120; 429/121
[58] Field of Search ..................... 429/50, 94, 62, 429/120, 121

[56] References Cited

U.S. PATENT DOCUMENTS

| | | |
|---|---|---|
| 1,176,970 | 3/1916 | Luthy . |
| 2,968,686 | 1/1961 | Duddy . |
| 3,655,455 | 4/1972 | Jones . |
| 4,399,607 | 8/1983 | May . |
| 4,777,101 | 10/1988 | Blomberg et al. . |
| 4,874,681 | 10/1989 | Rippel . |
| 4,883,726 | 11/1989 | Pelad .................................. 424/120 |
| 5,091,275 | 2/1992 | Brecht et al. . |
| 5,128,218 | 7/1992 | Tokunaga et al. . |
| 5,187,031 | 2/1993 | Heiman et al. . |
| 5,270,133 | 12/1993 | Baumann, III . |
| 5,384,217 | 1/1995 | Binder et al. . |
| 5,586,994 | 12/1996 | Hasegawa et al. . |
| 5,607,797 | 3/1997 | Hasegawa et al. . |
| 5,611,128 | 3/1997 | Wirtz . |

FOREIGN PATENT DOCUMENTS

| | | |
|---|---|---|
| 1173698 | 2/1959 | France . |
| 55-3133 | 1/1980 | Japan . |
| 56-28463 | 3/1981 | Japan . |

OTHER PUBLICATIONS

Patent Abstracts of Japan, vol. 13, No. 220 (E–762), May 23, 1989 & JP 01 033856 A (Yuasa Battery Co., Ltd.), Feb. 3, 1989.

Patent Abstracts of Japan, vol. 004, No. 170 (E–035), Nov. 22, 1980 & JP 55 119343 A (Japan Storage Battery Co., Ltd.) Sep. 13, 1980, & Chemical Abstracts, vol. 94, No.6, Feb. 9, 1981, Columbus, OH; Abstract No. 33736, "Secondary Batteries".

*Primary Examiner*—Maria Nuzzolillo
*Assistant Examiner*—Mark Ruthkosky
*Attorney, Agent, or Firm*—Wall Marjama Bilinski & Burr

[57] ABSTRACT

A lead-acid battery including a case, a plurality of negative and positive electrode plates arranged in the case, a plurality of separators interposed between the negative and positive electrode plates, and a plenum stabilization material disposed within the case to maintain the positions of the electrode plates relative to one another and to other components within the case. The plenum stabilization material includes a compound that (i) is solid during normal operation of the battery and (ii) can undergo reversible physical change in state from solid to liquid when the battery is subjected to or is operated under abnormal conditions.

17 Claims, 4 Drawing Sheets

SEALED RECHARGE BATTERY PLENUM STABILIZED WITH STATE CHANGEABLE SUBSTANCE

FIELD OF THE INVENTION

The present invention relates to sealed rechargeable batteries that have increased charging cycles and improved plenum stabilization both during use and during overcharging conditions. In particular, the present invention relates to sealed rechargeable batteries that are plenum stabilized with a solidified substance which is capable of undergoing reversible changes in state from solid to liquid.

BACKGROUND OF THE INVENTION

Sealed rechargeable batteries have been used for a number of years in applications requiring portable, renewable power. One example of such an application is in the field of portable, hand-held power tools. Another example is in the field of electric vehicles, which typically employ a bank of rechargeable lead-acid batteries. In both cases, the batteries used to power these devices must be recharged on a regular basis.

One problem with recharging batteries, such as sealed lead-acid batteries, is that the useful recharge cycle life of each battery is relatively short. While the present assignee has manufactured sealed lead-acid batteries capable of reaching 300 charging cycles, the typical sealed lead-acid battery can rarely surpass 150 charging cycles. This is in part due to short circuits that form in the battery over time due to manufacturing defects or movement of the electrode plates due to vibration and/or impact damage. Short circuits also result from volumetric changes that occur in the battery plates during discharging and recharging. The present inventors discovered that the battery plates also tend to produce moss-like protuberances after repeated charging cycles, and such plate mossing eventually causes shorting between the electrodes of adjacent cells, between electrodes and cell terminals, or between electrodes of the same cell through the separator material. Plate mossing tends to get progressively worse with every charge cycle.

Another problem with rechargeable batteries is that the charging load applied to the battery is sometimes difficult to regulate. Overcharging is one common problem associated with recharging batteries. In the case of an electric vehicle, for example, where the entire bank of batteries would be recharged simultaneously, it is not uncommon for one of the batteries to have a higher remnant charge than the remaining batteries. When recharging such a bank of batteries, that one battery would tend to be overcharged relative to the remaining batteries. One approach to avoiding overcharging such fully charged batteries is to employ a battery management system (BMS), which diverts the charging current around any batteries in the bank that are fully charged. Such systems, however, are very expensive.

While most batteries are engineered to withstand certain levels of overcharging, heretofore it has been very difficult to prevent the sometimes catastrophic results associated with cases of extreme overcharging. For example, it is possible for the battery case to explode if the generation of gases within the battery plenum exceeds the venting capacity of the battery. Alternatively, the gases generated within the battery during charging could be ignited if a short circuit condition has formed in the battery since the last charging cycle. Such plenum destabilization during charging represents a major safety problem that the battery industry has attempted to solve for many years.

Short circuit situations within the battery also cause excessive heat generation within the battery, particularly in the immediate proximity of the short circuit. Such excessive heat generation can cause degradation of the electrode plates, which, of course, would render the battery inoperative.

As mentioned briefly above, yet another problem with batteries in general is their inherent sensitivity to external vibration. Lead-acid batteries in particular are susceptible to deterioration in performance when subjected to severe vibrations, such as those experienced during shipping and handling, as well as during use. Accidental impacts of the battery can cause shifting of the plates which in turn would cause, at least eventually, short circuit conditions within the battery. Again, such short circuit conditions cause excessive heat and/or sparking during charging, which in turn can result in catastrophic failure of the battery.

It has been known in the art to apply adhesive to the base of the battery plates and battery case to enhance the vibration resistance of the battery. This method, however, fails to address the problem of electrode-to-electrode contact, especially due to plate mossing as first discovered by the inventors.

U.S. Pat. No. 4,777,101 discloses a sealed lead-acid battery that includes plastic partition walls formed in situ. This construction will likely increase the vibration resistance of the battery. However, it will also accentuate the problems that might occur during overcharging, since the gas generated during overcharging cannot escape the monolithic block of plastic within the battery case. Specifically, since the material making up the walls is cured, it cannot crack easily or melt within the battery to allow the gas to escape. Consequently, the threat of battery case explosion is more likely.

It would be desirable to provide a rechargeable battery having improved recharging cycle life, improved safety during overcharging, increased shock and vibration resistance, improved thermal stability, and improved control and containment of generated gases within individual cells. These features become especially important for consumer products applications, because the end user undoubtedly would like to minimize the need for battery replacement and be assured of the safety of the battery during recharging.

SUMMARY OF THE INVENTION

It is an object of the present invention to provide a sealed rechargeable battery that has increased recharging cycle life, and improved plenum stabilization during overcharging and use.

In accordance with a preferred embodiment of the present invention, a plenum stabilization material is introduced into the battery case to stabilize the position of the various internal components of the battery and prevent short circuits between those components. The plenum stabilization material is a compound that can undergo reversible changes in state from solid to liquid. The plenum stabilization substance is introduced into the battery case in a liquid, flowable state to fill space within the battery case not occupied by the internal battery components. The plenum stabilization substance is then allowed to solidify (usually through cooling) in situ to form a solid block of plenum stabilization material within the battery case.

The plenum stabilization material preferably is a hydrocarbon compound containing hydrocarbon molecules, more preferably a hydrocarbon compound containing long-chain saturated hydrocarbon molecules due to the increased melting point temperature of such compounds. One example of such a material is wax, and the most preferable compound to be used in the present invention is a petroleum wax due to its low cost. Other substances, however, such as thermoplastics, could be used as long as they are able to undergo reversible changes in state from solid to liquid and then back again.

When a lead-acid battery is discharged, $O_2$ and $H_2$ gases are consumed at the negative and positive electrodes, respectively. During recharging of the battery, these same gases evolve from the plates. The plenum stabilization material of the present invention is effective to hold, during charging, evolved gas in the region of the battery plates, which in turn, enhances recombination of those gases during the discharge cycle. In cases of overcharging, which results in excessive gas formation, the plenum stabilization material will break, or even melt, to form a common gas plenum in communication with the vent in the battery case.

In the case of short circuit conditions, the plenum stabilization material is effective to conduct heat away from the short to the external case. In extreme cases, the plenum stabilization material, at least in the area of the short, begins to change state from solid to liquid. The molten material then seeps between the shorted components in the battery and forms an electrically non-conductive barrier. Moreover, the heat generated at the short is transferred even more efficiently through the molten plenum stabilization material to the external battery case. Such conduction preserves the life of the battery as it removes heat away from the short circuit area and thus prevents melting of the internal battery components.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE PREFERRED EMBODIMENT

Figure 1:
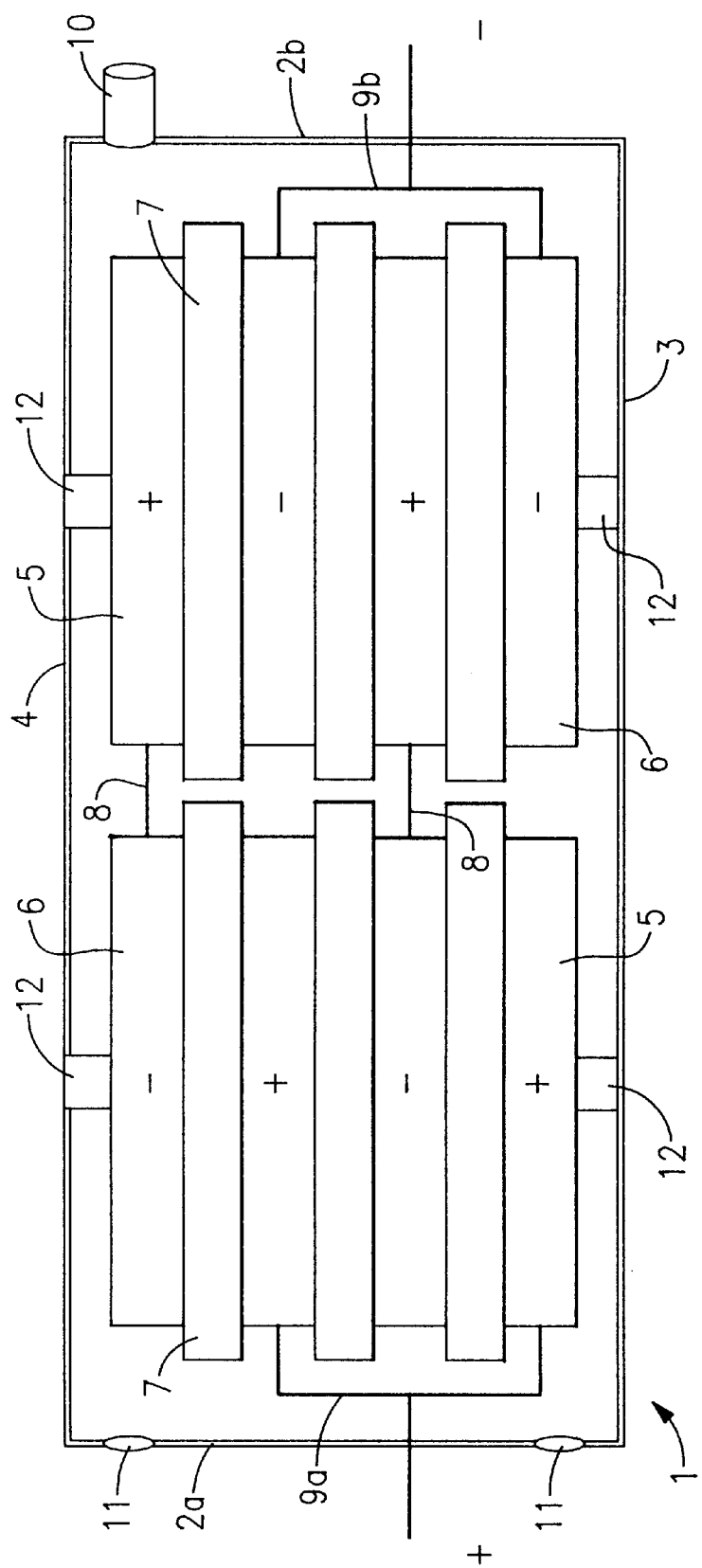
FIG. 1 is a diagrammatic side view of a lead-acid battery manufactured by the present assignee.

FIG. 1 shows an example of a lead-acid battery in which the plenum stabilization material in accordance with the present invention has been employed successfully. The battery includes a case 1 having side walls 2a and 2b, a bottom wall 3 and a lid 4. Positive electrode plates 5 and negative electrode plates 6, as well as separators 7, are stacked in case 1 in a known manner to form two cells of the battery. Some of the electrode plates are monopolar while others are bipolar, as indicated by the intercell weft wires 8. Such plates are described in U.S. Pat. No. 4,964,878, the entirety of which is incorporated herein by reference. Each cell provides two volts so that the aggregate total output of the battery is four volts. Additional plates could be stacked or more cells could be added to increase the aggregate output of the battery.

Terminal connections 9a and 9b are secured to alternate monopolar plates and exit case 1 for connection to a load. A pressure release valve 10 is formed through the upper portion of side wall 2b to allow excess gas to escape from case 1. Drain holes 11 (which are sealed) are formed in the opposed side wall 2a, and are used during manufacture of the battery, as explained below.

The battery in FIG. 1 is manufactured by stacking the monopolar electrode plates, bipolar electrode plates and separators, and securing the stacks using compression cages, such as those described in U.S. Pat. No. 5,409,787, the entirety of which is incorporated herein by reference. The stacked assemblies are then positioned within case 1 on support pins 12. The terminal connections 9a and 9b are arranged and attached and then lid 4 is welded onto the top of case 1. FIG. 1 shows that lid 4 also includes support pins 12, and the compression cages are designed to engage pins 12 (top and bottom) to maintain the spatial relationship between the edges of the plate stacks and the interior side walls of case 1.

The case is then turned on its side so that side wall 2a is arranged as the bottom of the case, and the entire case is placed in a vacuum chamber. With the entirety of the battery under vacuum, acid is introduced, through the hole that will receive valve 10, into the interior of case 1 and absorbed by separators 7. Excess acid is allowed to drain under the influence of gravity through drain holes 11. After the separators have absorbed the appropriate amount of acid, the battery is removed from the vacuum chamber and maintained upright temporarily to allow any remaining free acid within case 1 to drain through holes 11. Holes 11 are then sealed, vent 13 is attached to the fill hole, and the battery is charged to form the active battery plates.

Figure 2:
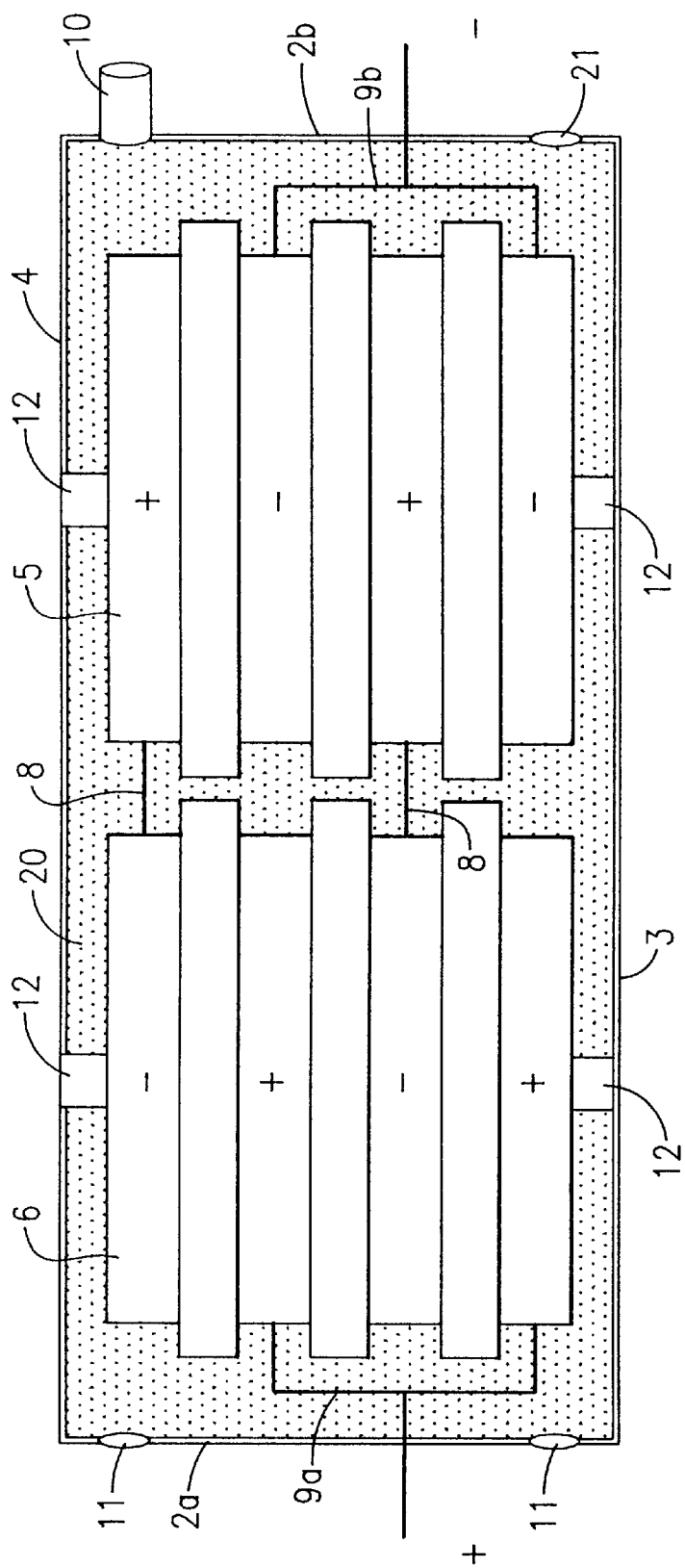
FIG. 2 is a diagrammatic side view of the lead-acid battery of FIG. 1 employing the plenum stabilization substance in accordance with the present invention.

FIG. 2 shows a battery that is substantially identical to the battery shown in FIG. 1, except that a plenum stabilization material 20 fills the spaces in and around the internal battery components. The battery of FIG. 2 is formed in the same manner as that of FIG. 1, except that, after drain holes 11 have been sealed, plenum stabilization material 20 is heated to a liquid, flowable state, and then introduced into the battery case 1 through the same fill hole used to introduce the acid. An additional vent hole 21 is formed in side wall 2b of case 1 to allow air within the battery case to escape as the plenum stabilization material fills the space within case 1. The plenum stabilization material is added to the case until full, and then valve 10 is attached as in FIG. 1 and vent hole 21 is sealed in the same manner as drain holes 11. The plenum stabilization material solidifies in situ upon cooling.

The plenum stabilization material 20 can be any material capable of being introduced into the battery case 1 in liquid, flowable form, and then solidified, usually through cooling, in situ to provide a structural matrix that maintains the relative positions of the components and prevents short circuit conditions between the electrode plates due to mossing or other conditions (e.g., the pooling of free acid).

The ability of the plenum stabilization material to change state reversibly from solid to liquid is important from a manufacturing standpoint, in that it must be in flowable, liquid form to facilitate its introduction into the spaces and voids formed among the components within the battery case. The ability of the plenum stabilization material to change state reversibly from solid to liquid is more important, however, from a use standpoint. Once in the battery case, the material solidifies to provide mechanical support for the internal components during battery use, and thus, enhance the vibration resistance of the battery. The material becomes liquid under conditions of severe overcharging of the battery during recharging cycles. This enhances the ability of the plenum stabilization material to act as a conductive heat transfer medium to conduct heat away from areas of short circuits among the battery plates and terminal connections.

While the plenum stabilization material can be any substance capable of reversible changes in state between solid and liquid, it preferably is a compound containing long-chained hydrocarbon molecules, more preferably a wax, and most preferably a high melting point petroleum wax. One example of such a petroleum wax is a microcrystalline wax known as SHELLMAX 400, manufactured by Shell Oil Company. The plenum stabilization material can also be a thermoplastic, so long as it can undergo reversible changes in state from solid to liquid.

Figure 3:
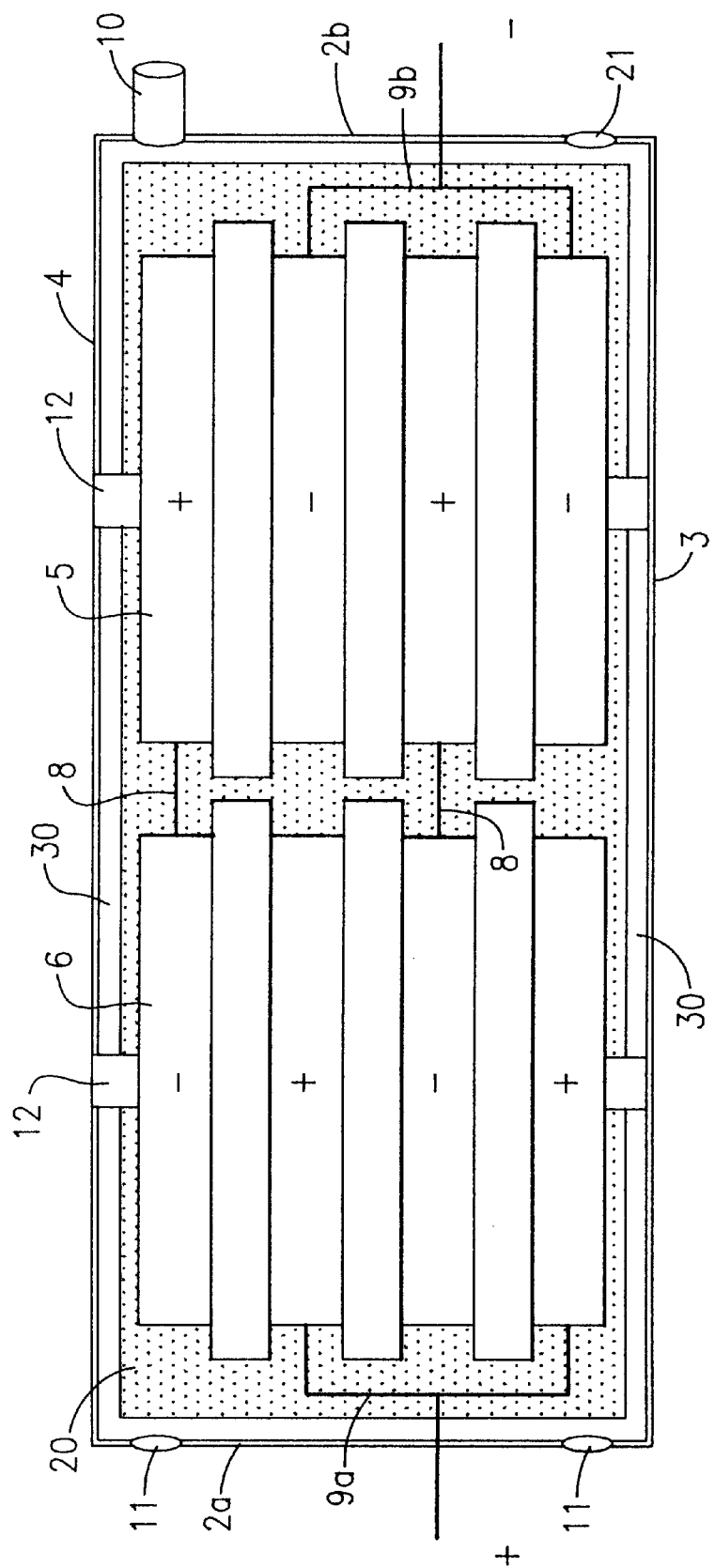
FIG. 3 shows the battery of FIG. 2 in an overcharging situation.
Figure 4:
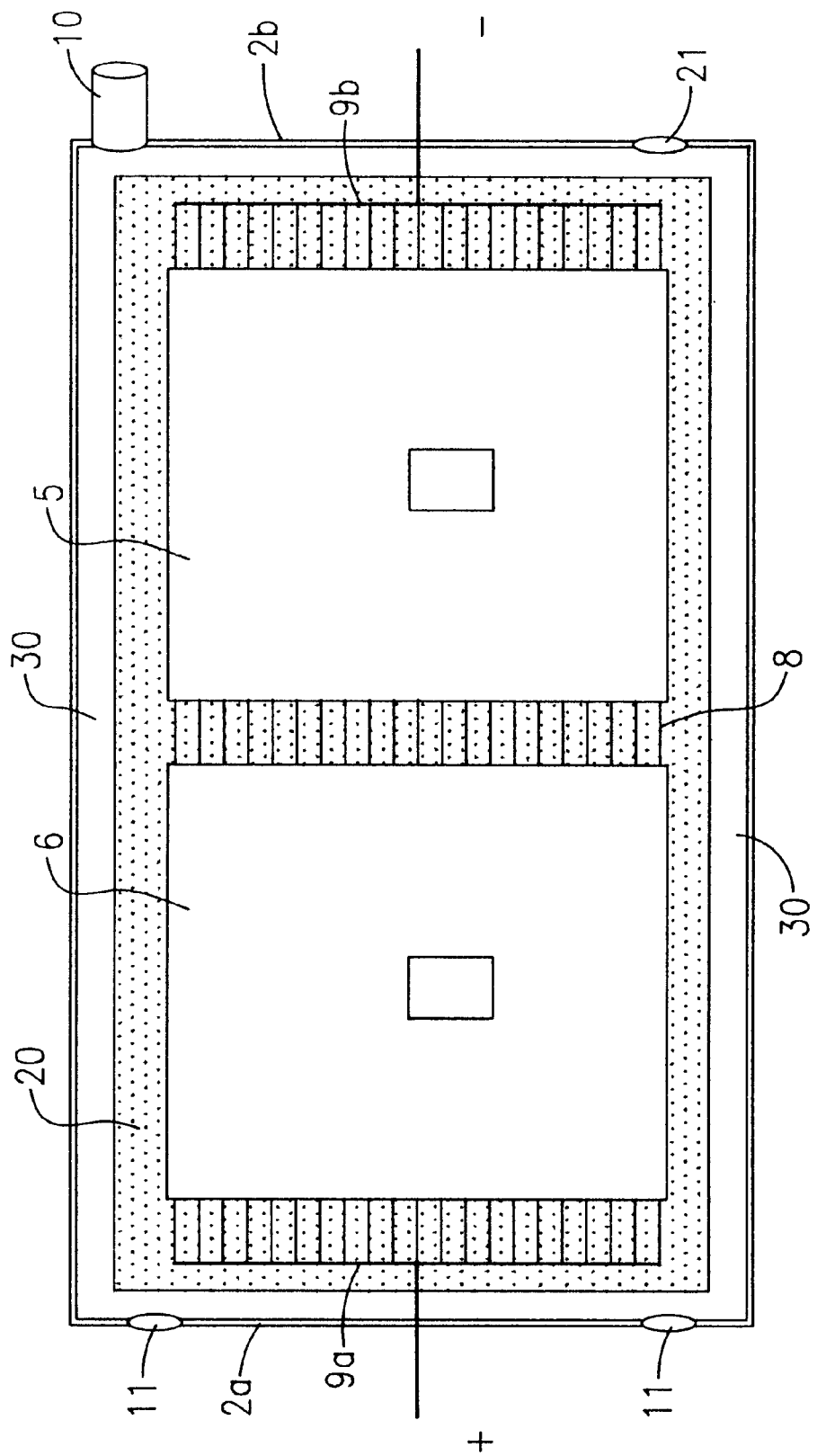
FIG. 4 is a top view of the battery shown in FIG. 3.

FIGS. 3 and 4 show side and top views of the battery of FIG. 2 in an overcharging situation. The excess gas formed at electrode plates 5 and 6 escapes from the proximity of the plates due to crack formation in plenum stabilization material 20, and causes case 1 to separate from plenum stabilization material 20 under a ballooning effect (shown in an exaggerated fashion in FIGS. 3 and 4). The plenum stabilization material preferably should also be incapable of bonding permanently to the material of the battery case (e.g., polypropylene), so as to allow this separation to occur during overcharging conditions. Separation of case 1 from plenum stabilization material 20 forms a common plenum 30 in which the gas evolved from electrodes 5 and 6 collects and communicates with valve 10. This common plenum design allows for the use of a single valve 10 to service all cells within the battery case, which in turn simplifies the overall battery design and reduces manufacturing cost.

The use of plenum stabilization material in accordance with the present invention substantially increases the recharging cycle life and improves the short circuit withstandability of batteries. As tested in lead-acid batteries, for example, the use of plenum stabilization material in accordance with the present invention in a battery of the type depicted in FIG. 1 increased the recharge cycle life of the battery from about 300 cycles to in excess of 700 cycles. Additionally, when exposed to an intentional internal short circuiting situation, a battery of the type shown in FIG. 1 failed catastrophically after only 15 minutes, whereas the same battery with the present plenum stabilization material employed therein did not fail even after 4 hours.

While the present invention has been particularly shown and described with reference to the preferred mode as illustrated in the drawings, it will be understood by one skilled in the art that various changes in detail may be effected therein without departing from the spirit and scope of the invention as defined by the claims. For example, although the above description is in the context of lead-acid batteries, it is believed that the present invention could be employed in other types of batteries as well. Additionally, while the plenum stabilization material is shown as contacting the electrode plates directly, it is possible to position each cell within a plastic bag to further isolate it electrically from other cells in the battery.

What is claimed is:

1. A sealed, rechargeable lead-acid battery comprising:
   a case;
   a plurality of negative and positive electrode plates arranged in the case;
   a plurality of separators interposed between the negative and positive electrode plates; and
   a plenum stabilization material disposed within the case and filling substantially all free space within the case, said plenum stabilization material comprising a compound that (i) is solid during normal operation of the battery and (ii) can undergo reversible physical change in state from solid to liquid when the battery is subjected to or is operated under abnormal conditions;
   whereby said plenum stabilization material maintains the positions of the electrode plates relative to one another and to other components within the case, inhibits shorts between internal conductors within the case, and substantially increases the rechargeable cycle life of the battery.

2. The battery of claim 1, wherein said plenum stabilization material comprises a hydrocarbon compound containing hydrocarbon molecules.

3. The battery of claim 2, wherein said hydrocarbon compound contains long-chain saturated hydrocarbon molecules.

4. The battery of claim 1, wherein said plenum stabilization material is a compound selected from the group consisting of waxes and thermoplastics.

5. The battery of claim 4, wherein said waxes comprise petroleum wax.

6. The battery of claim 1, wherein said electrode plates include monopolar and bipolar lead-pasted grids.

7. The battery of claim 6, wherein each of said bipolar plates includes a positive electrode and a negative electrode arranged in the same plane as said positive electrode, with at least one conductor connecting the positive and negative electrodes.

8. A method of increasing the rechargeable cycle life of a sealed, rechargeable lead-acid battery, comprising the step of filling substantially the entire free space within the internal compartment of the battery with a plenum stabilization material that (i) is solid during normal operation of the battery and (ii) can undergo reversible physical change in state from solid to liquid when the battery is subjected to or is operated under abnormal conditions.

9. The method of claim 8, wherein said plenum stabilization material comprises a hydrocarbon compound containing hydrocarbon molecules.

10. The method of claim 9, wherein said hydrocarbon compound contains long-chain saturated hydrocarbon molecules.

11. The method of claim 8, wherein said plenum stabilization material is a compound selected from the group consisting of waxes and thermoplastics.

12. The method of claim 11, wherein said waxes comprise petroleum wax.

13. A method of inhibiting shorts between internal conductors in a sealed, rechargeable lead-acid battery, comprising the step of filling substantially the entire free space within the internal compartment of the battery with a plenum stabilization material that (i) is solid during normal operation of the battery and (ii) can undergo reversible physical change in state from solid to liquid when the battery is subjected to or is operated under abnormal conditions.

14. The method of claim 13, wherein said plenum stabilization material comprises a hydrocarbon compound containing hydrocarbon molecules.

15. The method of claim 14, wherein said hydrocarbon compound contains long-chain saturated hydrocarbon molecules.

16. The method of claim 13, wherein said plenum stabilization material is a compound selected from the group consisting of waxes and thermoplastics.

17. The method of claim 16, wherein said waxes comprise petroleum wax.

* * * * *